United States Patent
Kou et al.

(10) Patent No.: US 12,439,406 B2
(45) Date of Patent: Oct. 7, 2025

(54) SIGNAL MECHANISM DETERMINATION FOR WIRELESS COMMUNICATIONS

(71) Applicant: ZTE Corporation, Guangdong (CN)

(72) Inventors: Shuaihua Kou, Shenzhen (CN); Wei Gou, Shenzhen (CN); Xianghui Han, Shenzhen (CN); Jing Shi, Shenzhen (CN); Xing Liu, Shenzhen (CN); Xingguang Wei, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 18/434,633

(22) Filed: Feb. 6, 2024

(65) Prior Publication Data
US 2024/0179703 A1    May 30, 2024

Related U.S. Application Data

(63) Continuation of application No. PCT/CN2022/088375, filed on Apr. 22, 2022.

(51) Int. Cl.
*H04W 72/1268* (2023.01)
*H04W 72/232* (2023.01)
*H04W 72/566* (2023.01)

(52) U.S. Cl.
CPC ..... *H04W 72/1268* (2013.01); *H04W 72/232* (2023.01); *H04W 72/566* (2023.01)

(58) Field of Classification Search
CPC ........... H04W 72/1268; H04W 72/232; H04W 72/566; H04L 5/0044
See application file for complete search history.

(56) References Cited

U.S. PATENT DOCUMENTS

| | | |
|---|---|---|
| 2019/0327755 A1 | 10/2019 | Xiong et al. |
| 2020/0052813 A1* | 2/2020 | Hosseini ............... H04L 1/0067 |
| 2021/0058922 A1 | 2/2021 | Han et al. |
| 2021/0091918 A1 | 3/2021 | Lee et al. |
| 2022/0124711 A1 | 4/2022 | Zhou et al. |
| 2022/0330182 A1* | 10/2022 | Kim ....................... H04L 5/0044 |

(Continued)

FOREIGN PATENT DOCUMENTS

| | | |
|---|---|---|
| WO | 2020096330 A1 | 5/2020 |
| WO | 2023201677 A1 | 10/2023 |

OTHER PUBLICATIONS

International Search Report for International Application No. PCT/CN2022/088375, Mail Date: Dec. 15, 2022. 7 pages.

(Continued)

*Primary Examiner* — Jae Y Lee
*Assistant Examiner* — Nick Anon Sundara
(74) *Attorney, Agent, or Firm* — Perkins Coie LLP

(57) ABSTRACT

This document generally relates to wireless communication that includes at least one communication node determining that a first resource overlaps a transmission; and determining to cancel or rate match the transmission in response to the first resource overlapping the transmission. This document also relates to wireless communication that includes at least one communication node determining that a first resource overlaps a transmission of a signal; and determining whether to receive the signal in response to the first resource overlapping the signal, wherein rate matching is performed for the signal.

18 Claims, 7 Drawing Sheets

(56) References Cited

U.S. PATENT DOCUMENTS

| | | | |
|---|---|---|---|
| 2023/0254105 A1* | 8/2023 | Wong | H04L 5/0053 370/281 |
| 2024/0057100 A1* | 2/2024 | Agiwal | H04W 4/06 |
| 2024/0129101 A1* | 4/2024 | Yuan | H04L 5/14 |

OTHER PUBLICATIONS

Apple Inc., "On Rel-18 Full-duplex Operation," 3GPP TSG RAN Meeting #93-e, Electronic Meeting, Sep. 13-17, 2021, RP-212369.
ASUSTeK, "Discussion on aspects related to duplex operation," 3GPP TSG RAN WG1 #106bis-e e-Meeting, Oct. 11-19, 2021, R1-2110108.
CMCC, "Motivation of Study for Full Duplex in NR," 3GPP TSG RAN Rel-18 Workshop Electronic Meeting, Jun. 28-Jul. 2, 2021, RWS-210353.
Ericsson, "On Full Duplex," 3GPP TSG-RAN Rel-18 workshop, Electronic meeting, Jun. 28-Jul. 2, 2021, Tdoc RWS-210295.
NTT Docomo, Inc. "Study on Full Duplex for NR," 3GPP TSG RAN Rel-18 Workshop, Electronic Meeting, Jun. 28 to Jul. 2, 2021, RWS-210274.
Extended European Search Report from European Patent Application No. 22937913.6 dated Aug. 30, 2024.

* cited by examiner

SIGNAL MECHANISM DETERMINATION FOR WIRELESS COMMUNICATIONS

CROSS REFERENCE TO RELATED APPLICATIONS

This patent document is a continuation of and claims benefit of priority to International Patent Application No. PCT/CN2022/088375, filed on Apr. 22, 2022. The entire content of the before-mentioned patent application is incorporated by reference as part of the disclosure of this application.

TECHNICAL FIELD

This document is directed generally to wireless communication when a transmission overlaps a resource.

BACKGROUND

In time division duplex (TDD) systems, a slot may be used only downlink transmission or only for uplink transmission at a time. Correspondingly, downlink slots can only be used for downlink transmissions, and uplink slots can only be used for uplink transmissions. In contrast, when full duplexing is used, a slot can be used for both a downlink transmission and an uplink transmission. In general, the downlink transmission and the uplink transmission may be allocated different frequency resources. However, in such cases, interference may be created caused between the uplink transmission and downlink transmissions. Ways to reduce or alleviate such interference may be desirable.

SUMMARY

This document relates to methods, systems, apparatuses and devices for wireless communication. In some implementations, a method for wireless communication includes: determining, with at least one communication node, that a first resource overlaps a transmission; and determining, with the at least one communication node, to cancel or rate match the transmission in response to the first resource overlapping the transmission.

In some other implementations, a method for wireless communication includes: determining, with at least one communication node, that a first resource overlaps a transmission of a signal; and determining, with the at least one communication node, whether to receive the signal in response to the first resource overlapping the signal, wherein rate matching is performed for the signal.

In some other implementations, a device, such as a network device, is disclosed. The device may include one or more processors and one or more memories, wherein the one or more processors are configured to read computer code from the one or more memories to implement any of the methods above.

In yet some other implementations, a computer program product is disclosed. The computer program product may include a non-transitory computer-readable program medium with computer code stored thereupon, the computer code, when executed by one or more processors, causing the one or more processors to implement any of the methods above.

The above and other aspects and their implementations are described in greater detail in the drawings, the descriptions, and the claims.

DETAILED DESCRIPTION

The present description describes various embodiments of systems, apparatuses, devices, and methods for wireless communications involving scheduling signal transmission.

Figure 1:
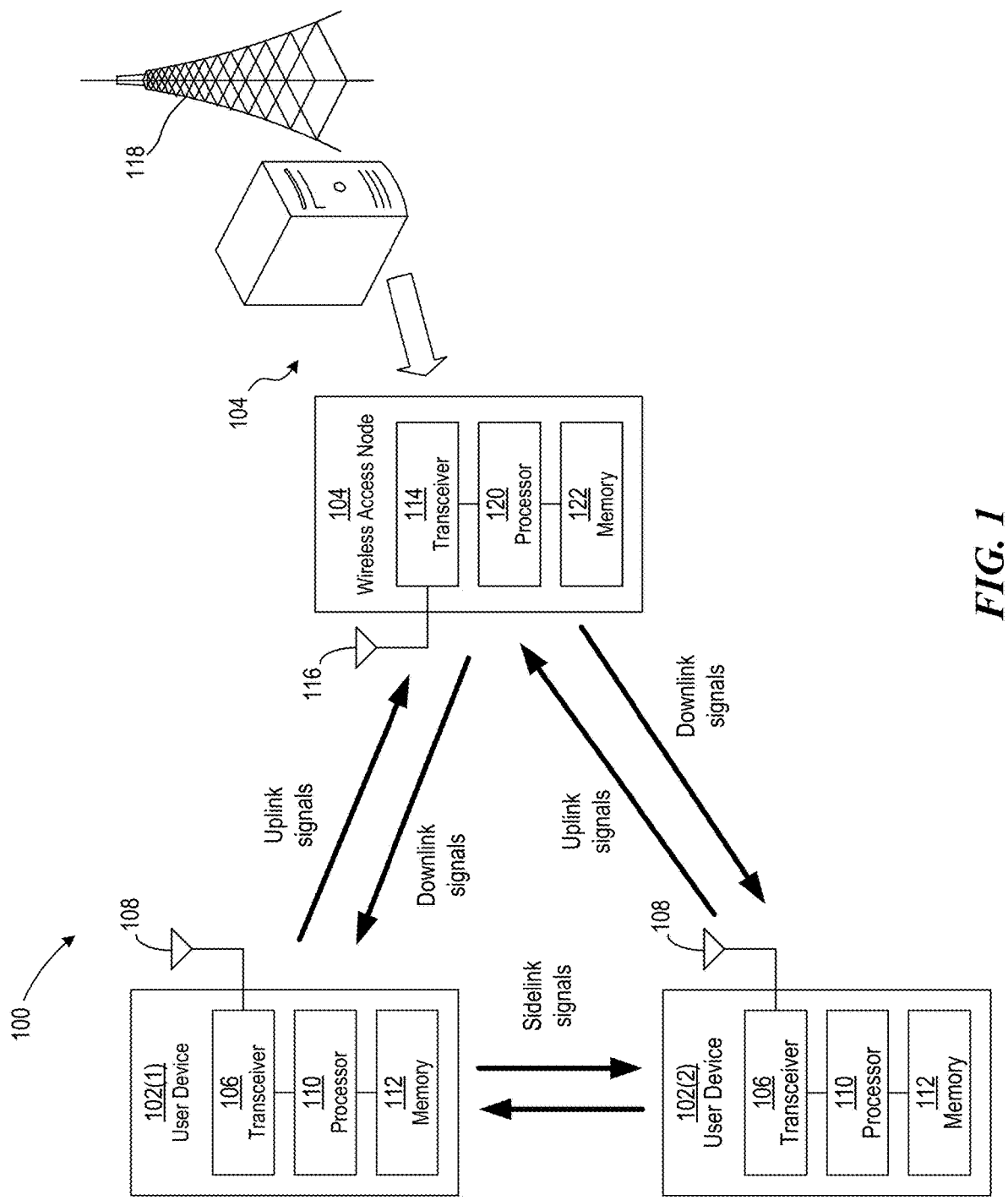
FIG. 1 shows a block diagram of an example of a wireless communication system.

FIG. 1 shows a diagram of an example wireless communication system 100 including a plurality of communication nodes (or just nodes) that are configured to wirelessly communicate with each other. In general, the communication nodes include at least one user device 102 and at least one wireless access node 104. The example wireless communication system 100 in FIG. 1 is shown as including two user devices 102, including a first user device 102(1) and a second user device 102(2), and one wireless access nodes 104. However, various other examples of the wireless communication system 100 that include any of various combinations of one or more user devices 102 and/or one or more wireless access nodes 104 may be possible.

In general, a user device as described herein, such as the user device 102, may include a single electronic device or apparatus, or multiple (e.g., a network of) electronic devices or apparatuses, capable of communicating wirelessly over a network. A user device may comprise or otherwise be referred to as a user terminal, a user terminal device, or a user equipment (UE). Additionally, a user device may be or include, but not limited to, a mobile device (such as a mobile phone, a smart phone, a smart watch, a tablet, a laptop computer, vehicle or other vessel (human, motor, or engine-powered, such as an automobile, a plane, a train, a ship, or a bicycle as non-limiting examples) or a fixed or stationary device, (such as a desktop computer or other computing device that is not ordinarily moved for long periods of time, such as appliances, other relatively heavy devices including Internet of things (IoT), or computing devices used in commercial or industrial environments, as non-limiting examples). In various embodiments, a user device 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Additionally, in general, a wireless access node as described herein, such as the wireless access node 104, may include a single electronic device or apparatus, or multiple (e.g., a network of) electronic devices or apparatuses, and may comprise one or more base stations or other wireless network access points capable of communicating wirelessly over a network with one or more user devices and/or with one or more other wireless access nodes 104. For example, the wireless access node 104 may comprise a 4G LTE base station, a 5G NR base station, a 5G central-unit base station, a 5G distributed-unit base station, a next generation Node B (gNB), an enhanced Node B (eNB), or other similar or next-generation (e.g., 6G) base stations, in various embodiments. A wireless access node 104 may include transceiver circuitry 114 coupled to an antenna 116, which may include an antenna tower 118 in various approaches, to effect wireless communication with the user device 102 or another wireless access node 104. The transceiver circuitry 114 may also be coupled to one or more processors 120, which may also be coupled to a memory 122 or other storage device. The memory 122 may store therein instructions or code that, when read and executed by the processor 120, cause the processor 120 to implement one or more of the methods described herein.

In various embodiments, two communication nodes in the wireless system 100—such as a user device 102 and a wireless access node 104, two user devices 102 without a wireless access node 104, or two wireless access nodes 104 without a user device 102—may be configured to wirelessly communicate with each other in or over a mobile network and/or a wireless access network according to one or more standards and/or specifications. In general, the standards and/or specifications may define the rules or procedures under which the communication nodes can wirelessly communicate, which, in various embodiments, may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

Additionally, in the wireless system 100, the communication nodes are configured to wirelessly communicate signals between each other. In general, a communication in the wireless system 100 between two communication nodes can be or include a transmission or a reception, and is generally both simultaneously, depending on the perspective of a particular node in the communication. For example, for a given communication between a first node and a second node where the first node is transmitting a signal to the second node and the second node is receiving the signal from the first node, the first node may be referred to as a source or transmitting node or device, the second node may be referred to as a destination or receiving node or device, and the communication may be considered a transmission for the first node and a reception for the second node. Of course, since communication nodes in a wireless system 100 can both send and receive signals, a single communication node may be both a transmitting/source node and a receiving/destination node simultaneously or switch between being a source/transmitting node and a destination/receiving node.

Also, particular signals can be characterized or defined as either an uplink (UL) signal, a downlink (DL) signal, or a sidelink (SL) signal. An uplink signal is a signal transmitted from a user device 102 to a wireless access node 104. A downlink signal is a signal transmitted from a wireless access node 104 to a user device 102. A sidelink signal is a signal transmitted from a one user device 102 to another user device 102, or a signal transmitted from one wireless access node 104 to a another wireless access node 104. Also, for sidelink transmissions, a first/source user device 102 directly transmits a sidelink signal to a second/destination user device 102 without any forwarding of the sidelink signal to a wireless access node 104.

Additionally, signals communicated between communication nodes in the system 100 may be characterized or defined as a data signal or a control signal. In general, a data signal is a signal that includes or carries data, such multimedia data (e.g., voice and/or image data), and a control signal is a signal that carries control information that configures the communication nodes in certain ways in order to communicate with each other, or otherwise controls how the communication nodes communicate data signals with each other. Also, certain signals may be defined or characterized by combinations of data/control and uplink/downlink/sidelink, including uplink control signals, uplink data signals, downlink control signals, downlink data signals, sidelink control signals, and sidelink data signals.

For at least some specifications, such as 5G NR, data and control signals are transmitted and/or carried on physical channels. Generally, a physical channel corresponds to a set of time-frequency resources used for transmission of a signal. Different types of physical channels may be used to transmit different types of signals. For example, physical data channels (or just data channels) are used to transmit data signals, and physical control channels (or just control channels) are used to transmit control signals. Example types of physical data channels include, but are not limited to, a physical downlink shared channel (PDSCH) used to communicate downlink data signals, a physical uplink shared channel (PUSCH) used to communicate uplink data signals, and a physical sidelink shared channel (PSSCH) used to communicate sidelink data signals. In addition, example types of physical control channels include, but are not limited to, a physical downlink control channel (PDCCH) used to communicate downlink control signals, a physical uplink control channel (PUCCH) used to communicate uplink control signals, and a physical sidelink control channel (PSCCH) used to communicate sidelink control signals. As used herein for simplicity, unless specified otherwise, a particular type of physical channel is also used to refer to a signal that is transmitted on that particular type of physical channel, and/or a transmission on that particular type of transmission. As an example illustration, a PDSCH refers to the physical downlink shared channel itself, a downlink data signal transmitted on the PDSCH, or a downlink data transmission. Accordingly, a communication node transmitting or receiving a PDSCH means that the communication node is transmitting or receiving a signal on a PDSCH.

Additionally, for at least some specifications, such as 5G NR, and/or for at least some types of control signals, a control signal that a communication node transmits may include control information comprising the information necessary to enable transmission of one or more data signals between communication nodes, and/or to schedule one or more data channels (or one or more transmissions on data channels). For example, such control information may include the information necessary for proper reception, decoding, and demodulation of a data signals received on physical data channels during a data transmission, and/or for uplink scheduling grants that inform the user device about the resources and transport format to use for uplink data transmissions. In some embodiments, the control information includes downlink control information (DCI) that is transmitted in the downlink direction from a wireless access node 104 to a user device 102. In other embodiments, the control information includes uplink control information (UCI) that is transmitted in the uplink direction from a user device 102 to a wireless access node 104, or sidelink control information (SCI) that is transmitted in the sidelink direction from one user device 102(1) to another user device 102(2).

Additionally, in the wireless communication system 100, a slot format for a plurality of slots or frames can be configured by the wireless access node 104 or specified by a protocol. In particular examples, a slot can be indicated or specified as a downlink slot, a flexible slot, or an uplink slot. Also, an orthogonal frequency divisional multiplexing (OFDM) symbol may be indicated or specified as a downlink symbol, a flexible symbol, or an uplink symbol, in various embodiments.

Figures 2, 3:
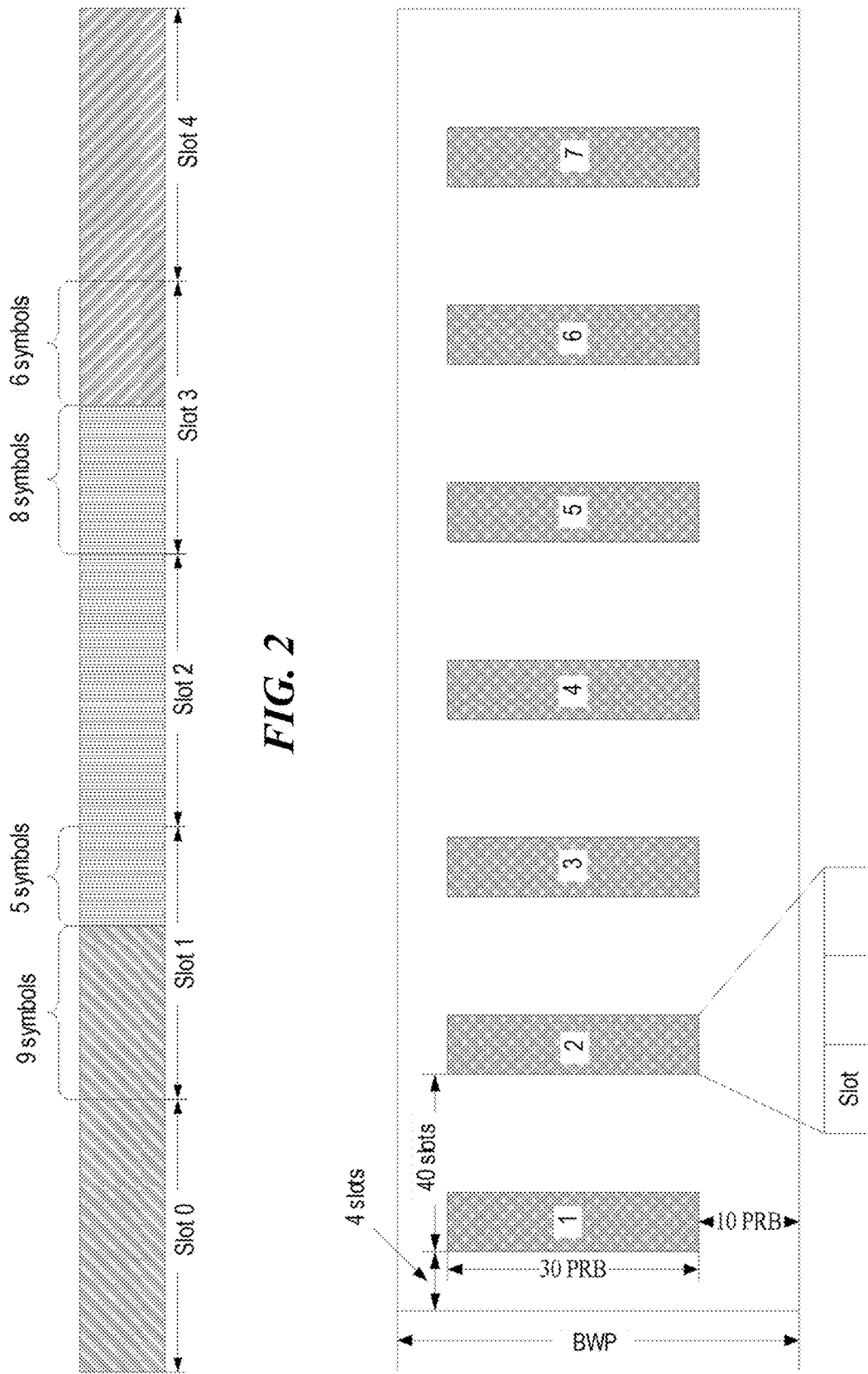
FIG. 2 shows a diagram of an example slot format.
FIG. 3 shows a diagram of an example of a plurality of first resource occasions.

FIG. 2 is a diagram of an example slot format. In FIG. 2, for example, five slots are shown, denoted by Slot 0, Slot 1, Slot 2, Slot 3, and Slot 4. The symbols of Slot 0 and the first nine symbols in Slot 1 are configured as downlink symbols. Accordingly, a downlink (DL) bandwidth part (BWP) includes these symbols/slots. Also, the last five symbols in the Slot 1, the symbols of Slot 2, and the first eight symbols in Slot 3 are configured as flexible symbols (i.e., they are used as uplink or downlink transmission symbols). Additionally, the last six symbols in Slot 3 and the symbols in Slot 4 are configured as uplink symbols. Accordingly, an uplink (UP) BWP includes these symbols/slots.

In various embodiments, the wireless access node 104 may configure a plurality of first resources for a user device 102. A configuration for the first resource may include or identify at least one of a period, a time offset, a number of slots, an OFDM symbol location, an OFDM symbol pattern, a sub-carrier location, a sub-carrier pattern, a number of resource blocks (RB), a starting RB, a frequency offset, a number of ports, a code division multiplexing (CDM) type, or a density.

In further detail, the period is the interval between two consecutive occasions of the first resource. The time offset is the interval between the boundary of a first system frame (e.g., the boundary of Slot 0 in system frame number (SFN) 0) and the first occasion of the first resource. The number of slots is the number of consecutive slots occupied by a resource occasion. The OFDM symbol location or the OFDM symbol pattern indicates the symbols in a slot occupied by a resource occasion. The sub-carrier location indicates the sub-carriers in a RB occupied by the first resource. The start RB indicates the first RB index (or number) of the resource occasion. The frequency offset is the interval between the first RB of the resource occasion and the lowest RB of a bandwidth part (or the system channel bandwidth, or common radio block). The number of RBs indicates the RBs occupied by the first resource. The density indicates the number of sub-carriers per RB per port.

Also, in various embodiments, the first resource may be periodic, semi-persistent, or aperiodic. For the periodic first resource, the resource occasion occurs periodically after being configured by the wireless access node 104. A semi-persistent first resource is activated or de-activated by the wireless access node via a medium access control (MAC) control element (CE) or a DCI. After a semi-persistent first resource is activated by the wireless access node 104, the resource occasions of the first resource occur periodically until the semi-persistent first resource is de-activated or released by the wireless access node 104.

An aperiodic first resource is triggered by the wireless access node 104 via a DCI. After an aperiodic first resource is triggered by the wireless access node 104, the resource occasion occurs once. For an aperiodic first resource, the triggering field is included in a DCI. The offset (or interval) between the DCI and the resource occasion is configured by the wireless access node 104. For example, the offset is k slots. If the DCI triggering the first resource is transmitted on a slot n, then the first resource occurs on slot n+k or starts from slot n+k. Alternatively, the DCI schedules a transmission, and the resource occasion occurs in the slot of the scheduled transmission. The transmission may be a downlink transmission, an uplink transmission, or a sidelink transmission. For example, if the DCI transmitted on slot n schedules an uplink transmission on a slot m and triggers a first resource, the first resource occurs on slot m.

FIG. 3 illustrates diagram of an example of a plurality of first resource occasions. As shown in the example of FIG. 3, a system frame includes ten slots, denoted by Slot 0-Slot 9. The configured period of the first resource is 40 slots. The time offset is 4 slots, which is relative to the first slot of SFN 0 (i.e., Slot 0). The wireless access node configures 30 physical resource blocks (PRB) for the first resource. Additionally, the wireless access node 104 configures three slots for the first resource. The frequency offset is 10 PRB, which is relative to the lowest PRB of the BWP. Also, the lowest PRB of the BWP is PRB 0.

For embodiments where the first resource is a periodic first resource, the resource occasion of the first resource occurs periodically. For example, FIG. 3 shows seven resource occasions. The first resource occasion occupies Slot 4, Slot 5 and Slot 6 of system frame 0 in the time domain, and 30 PRB (from PRB 10 to PRB 39 PRB) in the frequency domain. The second resource occasion occupies Slot 4, Slot 5, and Slot 6 of system frame 4 in the time domain, and 30 PRBs (from PRB 10 to PRB 39 PRB) in the frequency domain. The third, fourth, fifth, sixth, and seventh resource occasions are in system frames 8, 12, 16, 20, and 24, respectively.

For embodiments where the first resource is a semi-persistent first resource, assuming, as an example, that the first resource is activated before the first resource occasion and de-activated before the fifth resource occasion, then there are only 4 resource occasions for the semi-persistent first resource—i.e., the first, second, third, fourth resource occasions.

In some embodiments, the wireless access node 104 may configure the resource occasion of the first resource to only occur in the DL BWP, DL slot, DL symbol, flexible slot, or flexible symbol. In such embodiments, a resource occasion of the first resource occurs only if the determined time domain resource of the resource occasion is in the DL BWP, DL slot, DL symbol, flexible slot, or flexible symbol. In the example of FIG. 3, the user device 102 and/or the wireless access node 104 may determine that the first resource occasion occupies Slot 4, Slot 5, and Slot 6 of system frame 0 in the time domain. If Slot 4, Slot 5, and Slot 6 are downlink slots, then the first resource occasion occurs. If Slot 4, Slot 5, and Slot 6 are uplink slots, then the first resource occasion actually does not occur. If Slot 4 and Slot 5 are downlink slots, and Slot 6 is an uplink slot, then actually the first resource occasion only occurs in Slot 4 and Slot 5, and the first resource occasion only occupies Slot 4 and Slot 5 in the time domain.

In some embodiments, the wireless access node 104 may configure that the resource occasion of the first resource only occurs in the UL BWP, UL slot, or UL symbol. In such embodiments, a resource occasion of the first resource occurs only if the determined time domain resource of the resource occasion is in the UL BWP, UL slot, or UL symbol. In the example of FIG. 3, the user device 102 and/or the wireless access node 104 may determine that the first resource occasion occupies Slot 4, Slot 5, and Slot 6 of system frame 0 in the time domain. If Slot 4, Slot 5, and Slot 6 are uplink slots, then the first resource occasion occurs. If Slot 4, Slot 5 and Slot 6 are downlink slots, then the first resource occasion actually does not occur. If Slot 4 and Slot 5 are uplink slots, and Slot 6 is a downlink slot, then actually the first resource occasion only occurs in Slot 4 and Slot 5, and the first resource only occupies Slot 4 and Slot 5 in the time domain.

Figure 4:
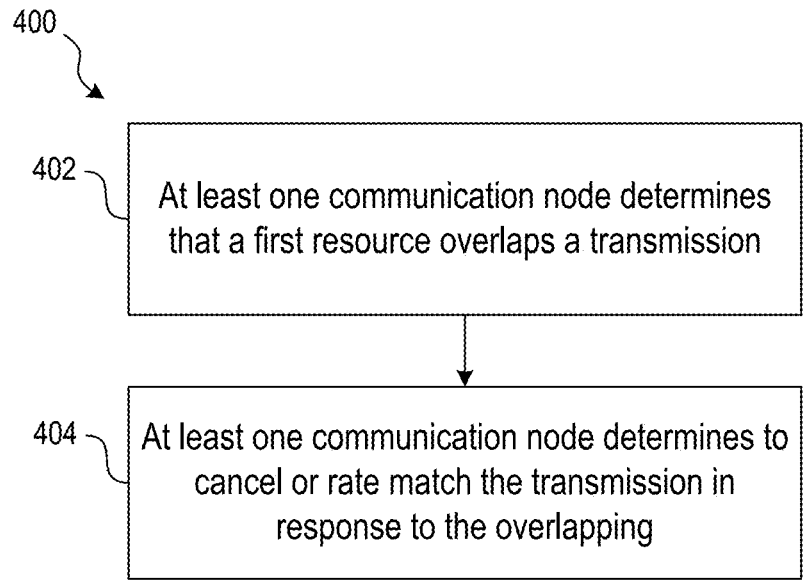
FIG. 4 shows a flow chart of an example method of wireless communication that includes overlap between a transmission and a resource.

FIG. 4 is a flow chart of an example method 400 for wireless communication that at least one communication node may perform when, or in response to, a first resource overlapping a transmission. The at least one communication node may include one or more user devices 102, one or more wireless access nodes 104, or one or more user devices 102 and one or more wireless access node 104.

At block 402, the at least one communication node may determine that the first resource overlaps a transmission. In various embodiments, the transmission includes at least one of a PUSCH, a PUCCH, a physical random access channel (PRACH), or a sounding reference signal (SRS). At block 404, the at least one communication node may determine to cancel or rate match the transmission in response to the first resource overlapping the transmission.

Figure 5:
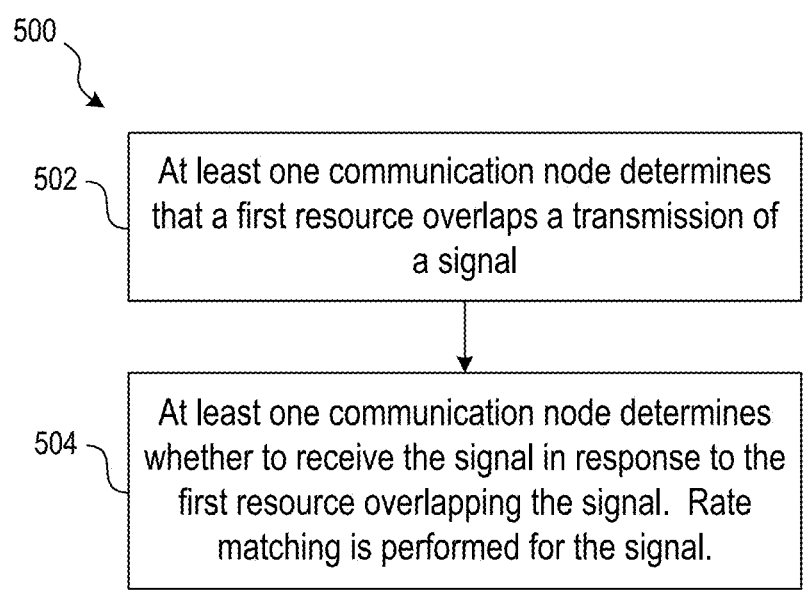
FIG. 5 shows a flow chart of another example method of wireless communication that includes overlap between a transmission and a resource.

FIG. 5 is a flow chart of another example method 500 for wireless communication that at least one communication node may perform when, or in response to, a first resource overlapping a transmission. At block 502, at least one communication node may determine that a first resource overlaps a transmission of a signal. At block 504, the at least one communication node may determine whether to receive the signal in response to the first resource overlapping the signal. If the at least one communication node determines not to receive the signal, then the transmission may be cancelled. In addition, if the at least one communication node determines to receive the signal, then the at least one communication node may perform rate matching for the signal. Accordingly, the signal that is received may be rate matched by the communication node that transmitted the signal. In some of these embodiments, the wireless access node 104 is the communication node that is to receive the signal from the user device 102. For such embodiments, the wireless access node 104 and/or the user device 102 may determine whether the wireless access node 104 is to receive the signal at block 504. If the user device 102 and/or the wireless access node 104 determines that the wireless access node 104 is to receive the signal, then in response, the user device 102 may perform rate matching for the signal, and then transmit the rate-matched signal to the wireless access node 104. In turn, the wireless access node 104 may receive the rate-matched signal.

In further detail, in various embodiments of the method 400 and/or the method 500, a wireless access node 104, such as of the at least one communication node, may configure a first resource to be unavailable for a transmission. In various embodiments, the transmission may be a downlink transmission, an uplink transmission or a sidelink transmission. The downlink transmission may include at least one of: a PDCCH, channel state information reference signal (CSI-RS), a positioning reference signal (PRS), a demodulation reference signal (DM-RS), a phase-tracking reference signal (PT-RS), a synchronization signal/physical broadcast channel block (SSB), or a PDSCH. The uplink transmission may include a physical random access channel (PRACH), a SRS, a PUCCH, or a PUSCH. The sidelink transmission may include a physical sidelink shared channel (PSSCH), a physical sidelink broadcast channel (PSBCH), a physical sidelink control channel (PSCCH), or a physical sidelink feedback channel (PSFCH).

Additionally, in various embodiments, the wireless access node 104 may configure a behavior in event that there is overlapping between the transmission and a resource occasion of the first resource in at least one of the frequency domain or the time domain. In any of various embodiments, the behavior may be configured by a radio resource control (RRC) signal, a medium access control (MAC) control element (CE), or a DCI. In addition or alternatively, the behavior may include cancellation or rate matching. In this context, each of cancellation and rate matching may be considered different behavior types of the behavior. In particular, the wireless access node 104 may configure a user device 102, such as of the at least one communication node, to perform cancellation or rate matching when, or in response to a determination that, there is overlapping between the transmission and a resource occasion of the first resource in at least one of the frequency domain or the time domain. Additionally, in various embodiments, the behavior type may depend on the type of the signal of the transmission that is overlapping the first resource. As one example, if the overlapping transmission is a PUSCH, then the at least one communication node 104 may perform rate matching. As another example, if the overlapping transmission is a SRS, then the at least one communication node may perform cancellation.

Additionally, a DCI may schedule a transmission. There may be a field in the DCI to indicate the behavior of the transmission in event that the transmission overlaps with the first resource. For example, the field includes a value '1' that indicates the behavior is rate matching and a value '0' that indicates the behavior is cancellation.

Additionally, in various embodiments, in response to determining to rate match the transmission, the at least one communication node may map modulated symbols of the transmission only to one or more resources not occupied by the first resource. In further detail, modulated symbols or symbol sequence of the transmission may not be mapped to source elements (REs) of the resource occasion of the first resource if the transmission overlaps with the resource occasion of the first resource in the time domain and/or in the frequency domain. In other words, the at least one communication node may skip the REs of the first resource when mapping the modulated symbols or sequence of the first resource to REs. Also, for cancellation, if the transmission overlaps with a resource occasion of the first resource in the time domain and/or in the frequency domain, the at least one communication node may not perform the transmission. For example, if the transmission is an uplink transmission, the user device 102 may not transmit the transmission to the wireless access node 104.

Figure 6:
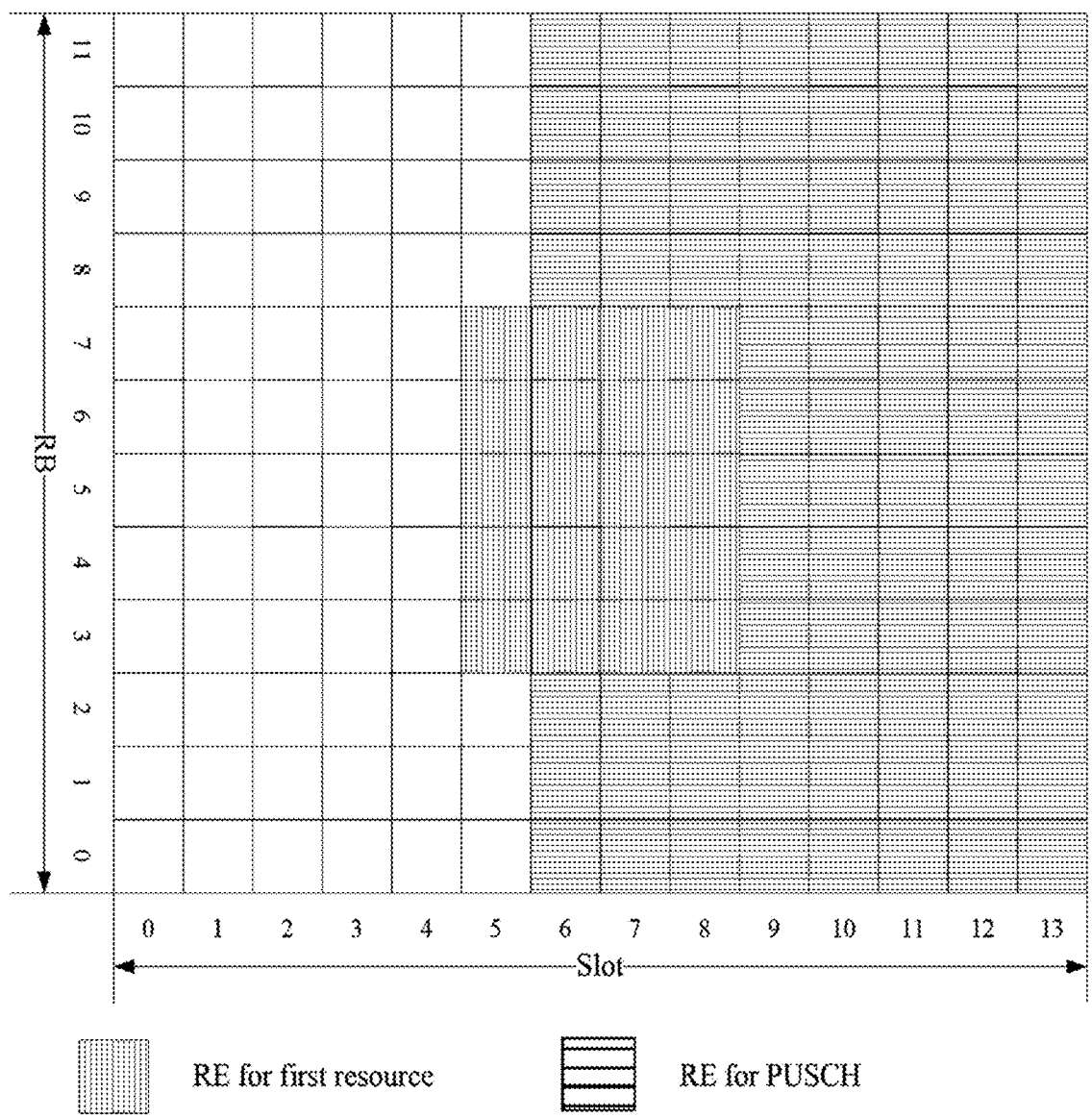
FIG. 6 shows a diagram of a first resource within a physical resource block.

FIG. 6 illustrates a diagram of an example of the first resource within a PRB. In the example in FIG. 6, the transmission is a PUSCH. Also, in the example, the PRB includes 14 OFDM symbols in the time domain (denoted by symbols 0-13) and 12 sub-carriers (denoted by sub-carriers 0-11). Also, in various embodiments, the first resource is configured with 1 antenna port. In the example in FIG. 6, in the time domain, the first resource occupies symbols 5, 6, 7 and 8. In the frequency domain, the first resource occupies sub-carriers 3, 4, 5, 6, and 7. The first resource occupies the same OFDM symbols and sub-carriers in each RB. Correspondingly, the resources of symbol 5, 6, 7 and 8 in the time domain and sub-carrier 3, 4, 5, 6 and 7 are not available for the PUSCH. For at least some embodiments, since there is overlap between the PUSCH and the first resource, the at least one communication node may cancel the PUSCH. For example, a wireless access node 104 may instruct a user device 102 to cancel the PUSCH, and in response to receipt of the instructions, the user device 102 may cancel the PUSCH. By cancelling the PUSCH, the user device 102 may not perform the PUSCH transmission. Similarly, for embodiments where the transmission is a PUSCH, SRS, or a PRACH, and the transmission is to be transmitted on any RE having symbol 5, 6, 7 and/or 8 in the time domain, and sub-carrier 3, 4, 5, 6, and 7 in the frequency domain, the at least one communication node may cancel the transmission.

In other embodiments, the at least one communication node may perform rate matching around the first resource. To illustrate using the example in FIG. 6 where the transmission is a PUSCH, a user device 102 may want to transmit the PUSCH on the slot, where the PUSCH occupies the last eight symbols in the time domain (i.e., from symbol 6 to symbol 13). However, since the first resource is occupying symbols 5-8 and sub-carriers 3-7, the at least one communication node may be unable to map the PUSCH to the sub-carriers 3, 4, 5, 6, and 7 on symbols 6, 7 and 8. Accordingly, when the modulated symbols of the PUSCH are mapped to the physical resource, the at least one communication node skips mapping the PUSCH to these REs occupied by the first resource. Rather, the at least one communication node may map the PUSCH only to the remaining REs within the PUSCH resource that are not occupied by the first resource. Also, in event that the PUSCH is transmitted on more than one antenna port, the at least one communication node may apply this mapping rule to each antenna port. That is, in the example in FIG. 6, for each antenna port, the PUSCH cannot be mapped to sub-carrier 3, 4, 5, 6, and 7 on symbol 6, 7 and 8.

Additionally, in various embodiments, the at least one communication node may determine to cancel or rate match the transmission in response to the first resource overlapping the transmission only when the transmission is in a downlink bandwidth part (DL BWP), a downlink OFDM symbol, or a flexible OFDM symbol. For example, the wireless access node 104 may further configure the user device 102 to perform cancellation or rate matching in response to the overlapping between the transmission and a resource occasion of the first resource only when the transmission is transmitted in a DL BWP, or a downlink or flexible OFDM symbol. In addition, if the transmission is transmitted in the UL BWP, the user device 102 may transmit the transmission without performing rate matching, even though the transmission overlaps with the first resource. In other embodiments, if the transmission is transmitted on the time domain resource indicated as an uplink time domain resource or flexible symbol, then the at least one communication node may perform the transmission without performing rate matching even though the transmission overlaps with the first resource.

Additionally, in various embodiments, if a resource of a signal transmission is within the first resource, the transmitting node may not perform the signal transmission and the receiving node may not perform the corresponding signal reception.

Additionally, in some embodiments, the first resource may be or include a zero power channel state information reference signal (ZP CSI-RS). In various of these embodiments, the wireless access node 104 may configure a plurality of ZP CSI-RS resources for a user device 102. In addition or alternatively, in various of these embodiments, a ZP CSI-RS can be periodic, semi-persistent, or aperiodic.

An aperiodic ZP CSI-RS may be triggered by the DCI scheduling an uplink transmission or a sidelink transmission. The DCI may include a first field that indicates the triggered ZP CSI-RS resource from a list of ZP CSI-RS resources. If a ZP CSI-RS resource is triggered, it occurs on the slot of the uplink transmission or sidelink transmission scheduled by the DCI.

Similar to above, REs of a ZP CSI-RS resource are not available for a transmission.

Figure 7:
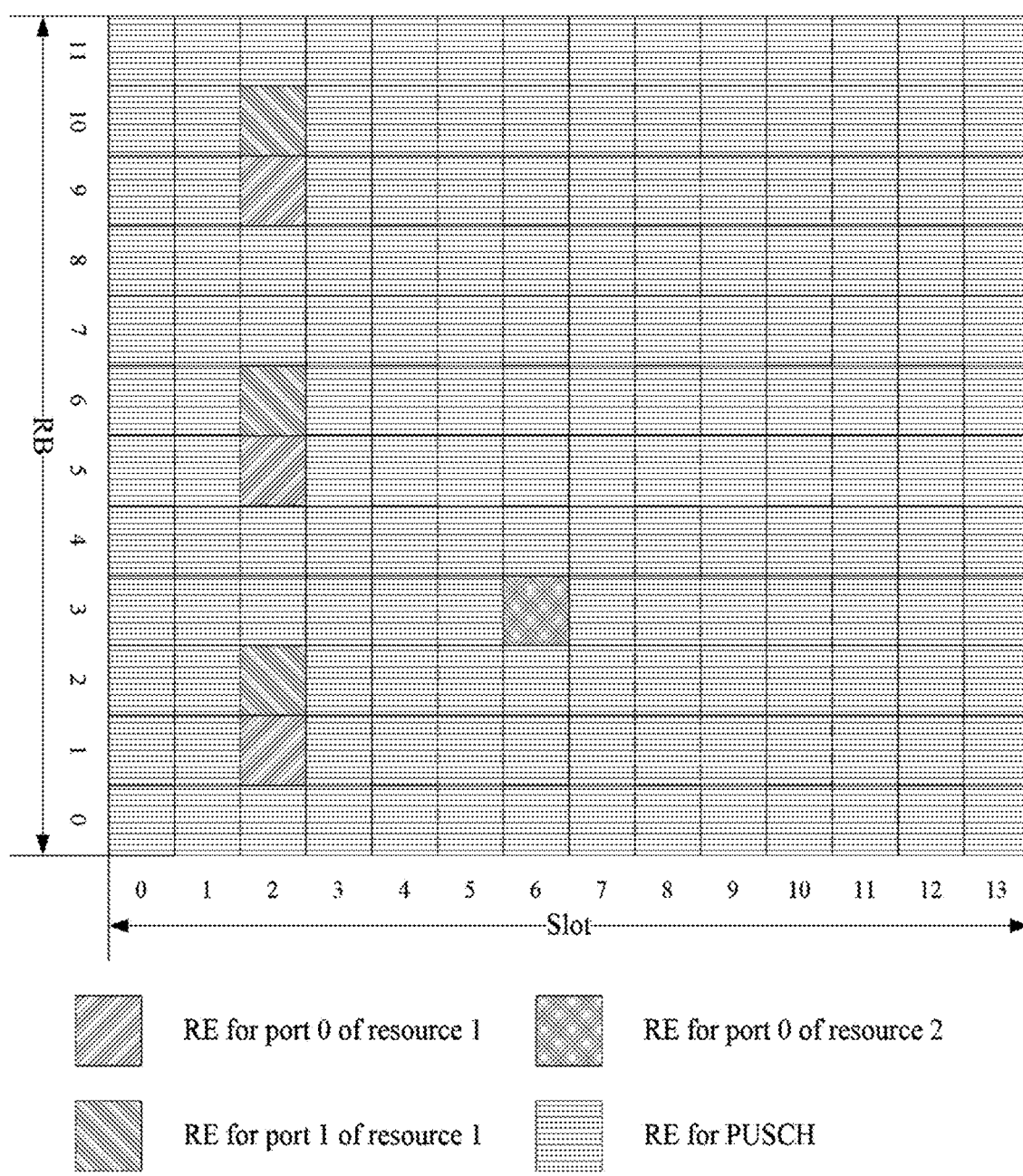
FIG. 7 shows a diagram of resources of an example zero power channel state information reference signal (ZP CSI-RS) in a slot.

FIG. 7 illustrates diagram of an example ZP CSI-RS resource. In the example, there are two ZP CSI-RS resources in the exampled slot, denoted by resource 1 and resource 2. Additionally, in the example, two antenna ports are configured for resource 1, including port 0 and port 1. Suppose, for example, the density of resource 1 is three. For the port 0 of resource 1, the occupied symbol is symbol 2 and the occupied sub-carriers are sub-carrier 1, sub-carrier 4, and sub-carrier 9. For port 1 of resource 1, the occupied symbol is symbol 2 and the occupied sub-carriers are sub-carrier 2, sub-carrier 5, and sub-carrier 10. Additionally, one antenna port is configured for resource 2, i.e. port 0. The density of resource 2 is 1. For resource 2, the occupied symbol is symbol 6 and the occupied sub-carrier is sub-carrier 3.

Additionally, in the example with respect to FIG. 7, the transmission is a PUSCH transmitted on the example slot and occupies all the symbols of the slot. As shown in FIG. 7, the PUSCH overlaps with both resource 1 and resource 2. The REs of both resource 1 and resource 2 are not available for PUSCH transmission, including the sub-carrier 1, 2, 5, 6, 9 and 10 on symbol 2, and sub-carrier 3 on symbol 6. Accordingly, the at least one communication node skips mapping modulated symbols of the PUSCH to these REs occupied by the ZP CSI-RS resource.

Additionally, in some embodiments, the at least one communication node determines one or more REs adjacent to or around one or more resource elements of the ZP CSI-RS as invalid or mute. An invalid RE can be to the immediate left, right, top, bottom, upper left, upper right, lower left, or lower right of the ZP CSI-RS RE. The REs of the ZP CSI-RS are not available for the transmission as well as the invalid REs. Accordingly, for these embodiments, the at least one communication node may skip mapping the modulated symbols of the transmission to the resource elements of the ZP CSI-RS and to the invalid REs. Alternatively, the at least one communication node may cancel a transmission in event that the transmission overlaps with any invalid RE. In various embodiments, the invalid REs may be configured by the wireless access node 104 or specified by a protocol, including the number of invalid RE, and the location of the invalid RE.

Figure 8:
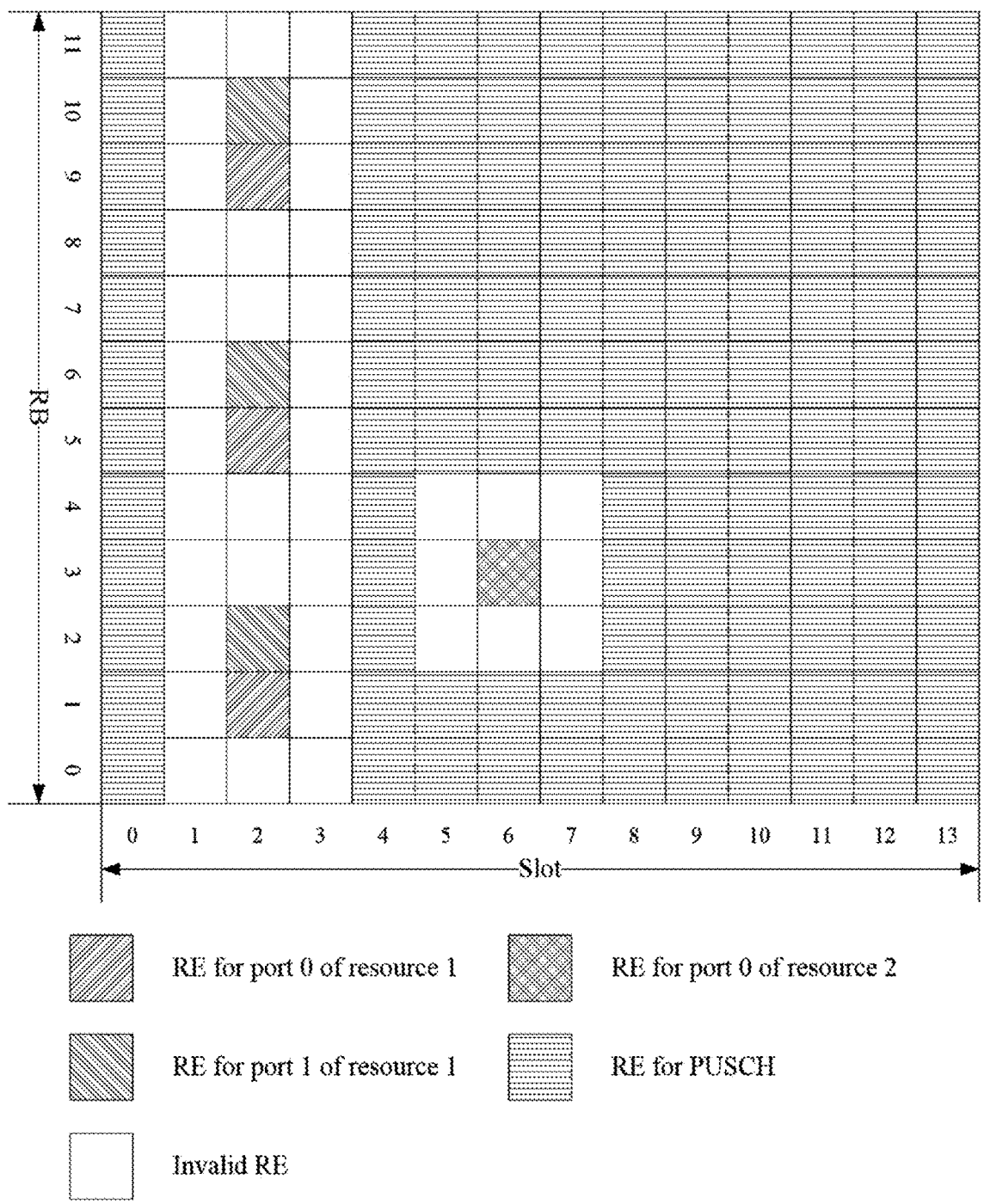
FIG. 8 shows a diagram of invalid resource elements (REs) around a ZP CSI-RS RE.

FIG. 8 illustrates an example diagram of invalid REs around ZP CSI-RS REs. In the example in FIG. 8, the wireless access node 104 may configure all REs adjacent to the ZP CSI-RS REs to be invalid. However, in other examples, fewer than all adjacent REs may be invalid. Additionally, in the example shown in FIG. 8, there are eight invalid REs around the RE for port 0 of resource 2. The invalid REs are located on the upper left, top, upper right, right, lower right, bottom, lower left, and left of the RE for port 0 of resource 2. Similarly, there are ten invalid REs around the RE for port 0 of resource 1 (e.g., sub-carrier 1 on symbol 2) and RE for port 1 of resource 1 (e.g., sub-carrier 2 on symbol 2). There are ten invalid REs around the RE for port 0 of resource 1 (e.g., sub-carrier 5 on symbol 2) and RE for port 1 of resource 1 (e.g., sub-carrier 6 on symbol 2). There are ten invalid REs around the RE for port 0 of resource 1 (e.g., sub-carrier 9 on symbol 2) and RE for port 1 of resource 1 (e.g., sub-carrier 10 on symbol 2). The PUSCH cannot be mapped to these invalid REs. Accordingly, the at least one communication node may skip mapping modulated symbols of the PUSCH to these invalid REs when mapping the PUSCH to the exampled slot.

Additionally, in some embodiments, the first resource may include a resource of a synchronization signal/physical broadcast channel block (SSB), a resource of a channel state information reference signal (CSI-RS), a resource of a positioning reference signal (RS), a resource within a SSB measurement timing configuration (SMTC) window, or a resource configured for received signal strength indication (RSSI) measurement, or a resource configured by a wireless access node. For at least some of these embodiments, the at least one communication node may cancel the transmission in response to the transmission comprising a sounding reference signal, or the first resource including the resource of the SSB, the resource of the CSI-RS, the resource of the positioning RS, the resource within the SMTC window, or the resource configured for RSSI measurement. In addition or alternatively, for some embodiments where the first resource includes the resource of the SSB, a user device 102 of the at least one communication node may perform the transmission and not receive the SSB in response to the transmission overlapping the resource of the SSB in a time domain but not in a frequency domain.

In further detail, in some embodiments, the first resource may include the resource (e.g., one or more RBs, one or more REs, one or more sub-carriers, one or more OFDM symbols, and/or one or more slots) of a synchronization signal/physical broadcast channel block (SSB). In various of these embodiments, the wireless access node 104 may indicate a plurality of SSBs transmitted by the wireless access node 104. Also, in various of these embodiments, the resource of a SSB is not available for the transmission.

In addition or alternatively, in some embodiments, the first resource may include the resource (e.g., one or more RBs, one or more REs, one or more sub-carriers, one or more OFDM symbols, and/or one or more slots) within SSB measurement timing configuration (SMTC). The wireless access node 104 may configure one or more SMTCs for the user device 102. In various embodiments, a configuration of a SMTC may include a period, a time offset, a duration, as non-limiting examples. In various of these embodiments, the resource with the same bandwidth as the SSB in the frequency and the same duration as SMTC in the time domain is not available for the transmission. In turn, the at least one communication node may skip mapping modulated symbols of the transmission to these resources.

In addition or alternatively, the first resource includes the resource (e.g., one or more RBs, one or more REs, one or more sub-carriers, one or more OFDM symbols, and/or one or more slots) of a CSI-RS or a positioning RS. The wireless access node 104 may configure a plurality of CSI-RS resources or a plurality of positioning RS resources. In various of these embodiments, the resource of the CSI-RS or the positioning RS is not available for the transmission. In turn, the at least one communication node may skip mapping modulated symbols of the transmission to these resources.

Figure 9:
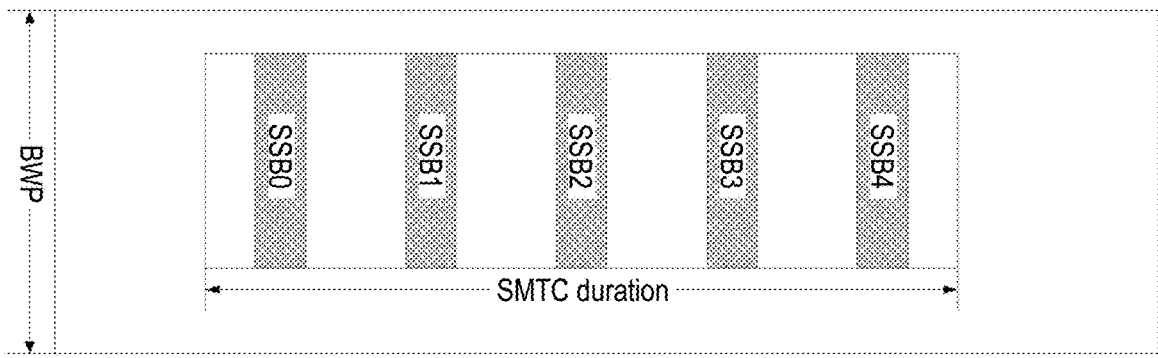
FIG. 9 shows a diagram of an example synchronization signal/physical broadcast channel block (SSB) and a SSB measurement timing configuration (SMTC) window.

FIG. 9 illustrates a diagram of an example of a SSB within a SMTC window or duration. In the example, there are five SSB occasions, denoted by SSB 0, SSB 1, SSB 2, SSB 3 and SSB 4. Suppose in one example, the wireless access node 104 only transmits SSB 0, SSB 1 and SSB 3. The transmission of SSB may be indicated by the wireless access node 104 via a bit map of '11010', where each bit corresponds to one SSB and the value '1' means that the corresponding SSB is transmitted and the value '0' means that corresponding SSB is not transmitted.

Further, in the example in FIG. 9, the resource with the same OFDM symbols as SSB 0, SSB 1 or SSB 3 in the time domain, and with the same RBs as SSB0, SSB 1 or SSB 3 in the frequency domain is not available for the transmission. Correspondingly, the at least one communication node may not map the PUSCH to these resources. FIG. 9 also shows the SMTC window. The resource within the SMTC window with the same bandwidth as SSB is not available for the transmission. In turn, the at least one communication node may skip mapping modulated symbols of the transmission to these resources.

In addition or alternatively, the first resource may include the resource (e.g., one or more RBs, one or more REs, one or more sub-carriers, one or more OFDM symbols, or one or more slots) for received signal strength indication (RSSI) measurement. The wireless access node 104 may configure the resource for RSSI measurement. In various of these embodiments, a bitmap may be used to indicate the slot within the SMTC duration (or window) for RSSI measurement. Within an indicated slot, one or more OFDM symbols may be indicated for RSSI measurement. Additionally, the resource indicated for RSSI measurement may not be available for transmission. In turn, the at least one communication node may skip mapping modulated symbols of the transmission to these resources.

Figure 10:
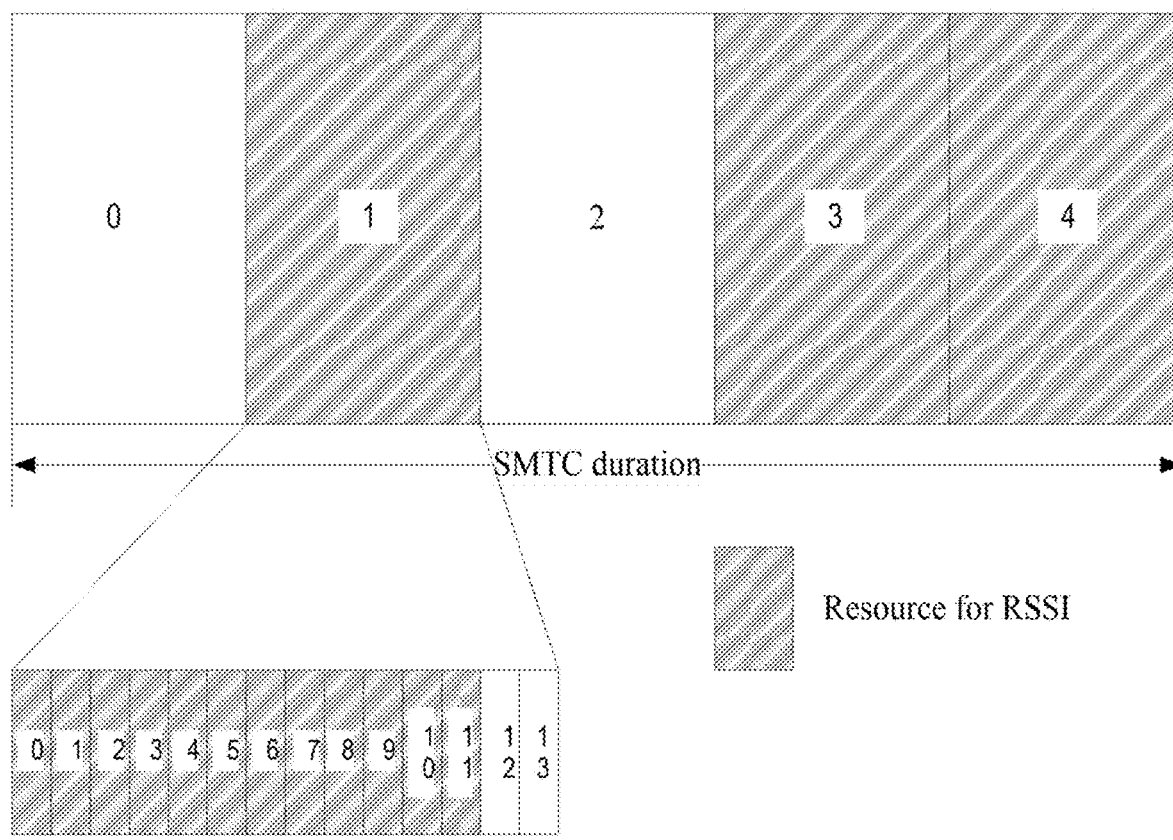
FIG. 10 shows a diagram of an example received signal strength indication (RSSI) measurement within a SMTC.

FIG. 10 illustrates a diagram of an example resource for RSSI measurement within the SMTC window or duration. In the example, there are 5 slots in the SMTC, denoted by Slots 0-4. A bitmap '01011' indicates that slot 1, slot 3 and slot 4 are used for RSSI measurement. Further, within these slots, the first 12 symbols are indicated for RSSI measurement. Correspondingly, the resources on the first 12 symbols in Slot 1, Slot 3 and Slot 4 are not available for the transmission. In turn, the at least one communication node may skip mapping modulated symbols of the transmission to these resources.

In addition, in various of these embodiments, similar to example in FIG. 8, the at least one communication node may determine one or more REs adjacent to the resource of the SSB, SMTC, CSI-RS, positioning RS, or RSSI measurement as invalid. The invalid REs are not available for the transmission. In turn, the at least one communication node may skip mapping modulated symbols of the transmission to the resources of the SSB, SMTC, CSI-RS, positioning RS, or RSSI measurement, and also to the one or more invalid REs.

In addition or alternatively, the wireless access node 104 may determine a priority for a DL signal reception that is higher or lower than a priority of a transmission for a user device 102. In some of these embodiments, the wireless access node 104 may configure a DL signal reception to have a higher priority than a transmission for a user device 102. When the transmission overlaps with the DL signal reception in the time domain and/or in the frequency domain, the user device 102 may perform the DL signal reception but not the transmission. In other of these embodiments, the wireless access node 104 may configure the DL signal reception to have a lower priority than a transmission for the user device 102. When the transmission overlaps with the DL signal reception in the time domain and/or in the frequency domain, the user device 102 may perform the transmission but not the DL reception. Additionally, in any of various of these embodiments, the DL signal includes at least one of SSB, CSI-RS, tracking reference signal (TRS), or a positioning reference signal (PRS).

In addition, in some of these embodiments, the wireless access node may configure a first SSB transmission for a first transmission and reception point (TRP) and a second SSB transmission for a second TRP. The configured first SSB resource is not available only for the transmission for the first TRP, and the configured second SSB resource is not available only for the transmission for the second TRP. In addition or alternatively, the resource of the first SSB transmission and the second SSB transmission is not available for the transmission.

In addition, in some embodiments, the wireless access node 104 may configure a first bandwidth range within the DL BWP. The indicated first bandwidth range may be used for uplink transmission, or sidelink transmission in addition to the downlink transmission. From the perspective of the user device 102, the indicated first bandwidth range is an uplink resource or a flexible resource. The resource (e.g., one or more RBs, one or more REs, one or more sub-carriers, one or more OFDM symbols, and/or one or more slots) of SMTC, CSI-RS, or positioning RS or resource for RSSI measurement within the DL BWP or in the DL slot, or DL symbol may not be used for uplink transmission. In other words, the resource (e.g., RB, RE, sub-carrier, OFDM symbol, or slot) of SMTC, CSI-RS, or positioning RS or resource for RSSI measurement within the DL BWP or in the DL slot, or DL symbol may not be indicated as an uplink resource or a flexible resource.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The subject matter of the disclosure may also relate to or include, among others, the following aspects:

A first aspect includes a method for wireless communication that includes: determining, with at least one communication node, that a first resource overlaps a transmission; and determining, with the at least one communication node, to cancel or rate match the transmission in response to the first resource overlapping the transmission.

A second aspect includes the first aspect, and further includes wherein the transmission comprises at least one of a physical uplink shared channel (PUSCH), a physical uplink control channel (PUCCH), a physical random access channel (PRACH), or a sounding reference signal (SRS).

A third aspect includes any of the first or second aspects, and further includes: in response to determining to rate match the transmission, mapping, with the at least one communication node, modulated symbols of the transmission only to one or more resources not occupied by the first resource.

A fourth aspect includes any of the first through third aspects, and further includes wherein the first resource is periodic, semi-persistent, or aperiodic.

A fifth aspect includes any of the first through fourth aspects, and further includes wherein determining to cancel or rate match the transmission in response to the first resource overlapping the transmission comprises: determining to cancel or rate match the transmission in response to the first resource overlapping the transmission when the transmission is in a downlink bandwidth part, a downlink orthogonal frequency division multiplexing (OFDM) symbol, or a flexible OFDM symbol.

A sixth aspect includes any of the first through fifth aspects, and further includes wherein the first resource comprises a zero power channel state information reference signal (ZP CSI-RS).

A seventh aspect includes the sixth aspect, and further includes wherein the ZP CSI-RS comprises an aperiodic ZP CSI-RS that is triggered by a downlink control information (DCI) that schedules an uplink transmission.

An eighth aspect includes any of the first through fifth aspects, and further includes wherein the first resource comprises a resource of a synchronization signal/physical broadcast channel block (SSB), a resource of a channel state information reference signal (CSI-RS), a resource of a positioning reference signal (RS), a resource within a SSB measurement timing configuration (SMTC) window, a resource configured for received signal strength indication (RSSI) measurement, or a resource configured by a wireless access node.

A ninth aspect includes the eighth aspect, and further includes wherein determining to cancel or rate match the transmission comprises determining to cancel the transmission in response to the transmission comprising a sounding reference signal (SRS), or the first resource comprising the resource of the SSB, the resource of the CSI-RS, the resource of the positioning RS, the resource within the SMTC window, or the resource configured for RSSI measurement.

A tenth aspect includes any of the eighth or ninth aspects, and further includes wherein the first resource comprises the resource of the SSB, the method further comprising: with a user device of the at least one communication node, performing the transmission and not receiving the SSB in response to the transmission overlapping the resource of the SSB in a time domain but not in a frequency domain.

An eleventh aspect includes any of the first through tenth aspects, and further includes: determining, with the at least one communication node, at least one resource element adjacent to one or more resource elements of the first resource as invalid; and skipping, with the communication node, mapping modulated symbols of the transmission to the one or more resource elements of the first resource and to the at least one resource element determined as invalid.

A twelfth aspect includes any of the first through eleventh aspects, and further includes: determining, with the at least one communication node, at least one resource element adjacent to one or more resource elements of the first resource as invalid; and canceling, with the at least one communication node, the transmission in response to the transmission overlapping with the at least one resource element determined as invalid at least in the time domain or the frequency domain.

A thirteenth aspect includes any of the first through twelfth aspects, and further includes wherein the transmission comprises an uplink transmission, the method further comprising: with a wireless access node of the at least one communication node, configuring a downlink transmission to have a higher priority than the uplink transmission.

A fourteenth aspect includes any of the first through thirteenth aspects, and further includes wherein the transmission comprises an uplink transmission, the method further comprising: with a user device of the at least one communication node, performing a downlink transmission and not the uplink transmission in response to the downlink transmission having a higher priority than the uplink transmission, and resources for the uplink transmission overlap resources for the downlink transmission in at least one of a time domain or a frequency domain.

A fifteenth aspect includes any of the first through fourteenth aspects, and further includes wherein the transmission comprises an uplink transmission, the method further comprising: with a wireless access node of the at least one communication node, configuring a downlink transmission to have a lower priority than the uplink transmission.

A sixteenth aspect includes any of the first through fifteenth aspects, and further includes wherein the transmission comprises an uplink transmission, the method further comprising: with a user device of the at least one communication node, performing the uplink transmission and not a downlink transmission in response to the downlink transmission having a lower priority than the uplink transmission, and resources for the uplink transmission overlap resources for the downlink transmission in at least one of a time domain or a frequency domain.

A seventeenth aspect includes a method for wireless communication that includes: determining, with at least one communication node, that a first resource overlaps a transmission of a signal; and determining, with the at least one communication node, whether to receive the signal in response to the first resource overlapping the signal, wherein rate matching is performed for the signal.

An eighteenth aspect includes the seventeenth aspect, and further includes any of the first through sixteenth aspects.

A nineteenth aspect includes a wireless communications apparatus comprising a processor and a memory, wherein the processor is configured to read code from the memory to implement any of the first through eighteenth aspects.

A twentieth aspect includes a computer program product comprising a computer-readable program medium comprising code stored thereupon, the code, when executed by a processor, causing the processor to implement any of the first through sixteenth aspects.

In addition to the features mentioned in each of the independent aspects enumerated above, some examples may show, alone or in combination, the optional features mentioned in the dependent aspects and/or as disclosed in the description above and shown in the figures.

The invention claimed is:

1. A method for wireless communication, the method comprising:
    determining, by at least one communication node, that a first resource overlaps a transmission;
    determining, by the at least one communication node, to cancel or rate match the transmission in response to the first resource overlapping the transmission;
    determining, by the at least one communication node, at least one resource element adjacent to one or more resource elements of the first resource as invalid; and
    skipping, by the at least one communication node, mapping modulated symbols of the transmission to the one or more resource elements of the first resource and to the at least one resource element determined as invalid in response to determining to rate match the transmission.

2. The method of claim 1, wherein the transmission comprises at least one of a physical uplink shared channel (PUSCH), a physical uplink control channel (PUCCH), a physical random access channel (PRACH), or a sounding reference signal (SRS).

3. The method of claim 1, further comprising:
    in response to determining to rate match the transmission, mapping, by the at least one communication node, modulated symbols of the transmission only to one or more resources not occupied by the first resource.

4. The method of claim 1, wherein the first resource comprises a zero power channel state information reference signal (ZP CSI-RS).

5. The method of claim 4, wherein the ZP CSI-RS comprises an aperiodic ZP CSI-RS that is triggered by a downlink control information (DCI) that schedules an uplink transmission.

6. The method of claim 1, wherein the first resource comprises a resource of a synchronization signal/physical broadcast channel block (SSB), a resource of a channel state information reference signal (CSI-RS), a resource of a positioning reference signal (RS), a resource within a SSB measurement timing configuration (SMTC) window, a resource configured for received signal strength indication (RSSI) measurement, or a resource configured by a wireless access node of the at least one communication node.

7. The method of claim 6, wherein the first resource comprises the resource of the SSB, the method further comprising:
performing, by a user device of the at least one communication node, the transmission and not receiving the SSB in response to the transmission overlapping the resource of the SSB in a time domain but not in a frequency domain.

8. The method of claim 1, further comprising:
canceling, by the at least one communication node, the transmission in response to the transmission overlapping with the at least one resource element determined as invalid at least in time domain or frequency domain in response to determining to cancel the transmission.

9. The method of claim 1, wherein the transmission comprises an uplink transmission, the method further comprising:
configuring, by a wireless access node of the at least one communication node, a downlink transmission to have a higher priority than the uplink transmission.

10. The method of claim 1, wherein the transmission comprises an uplink transmission, the method further comprising:
performing, by a user device of the at least one communication node, a downlink transmission and not the uplink transmission in response to the downlink transmission having a higher priority than the uplink transmission, and resources for the uplink transmission overlap resources for the downlink transmission in at least one of a time domain or a frequency domain.

11. A wireless communications apparatus comprising a processor configured to implement a method, the processor configured to:
determine, by at least one communication node, that a first resource overlaps a transmission; and
determine, by the at least one communication node, to cancel or rate match the transmission in response to the first resource overlapping the transmission;
determine, by the at least one communication node, at least one resource element adjacent to one or more resource elements of the first resource as invalid; and
skip, by the at least one communication node, mapping modulated symbols of the transmission to the one or more resource elements of the first resource and to the at least one resource element determined as invalid in response to determining to rate match the transmission.

12. The wireless communications apparatus of claim 11, wherein the transmission comprises at least one of a physical uplink shared channel (PUSCH), a physical uplink control channel (PUCCH), a physical random access channel (PRACH), or a sounding reference signal (SRS).

13. The wireless communications apparatus of claim 11, wherein the processor is further configured to:
in response to a determination to rate match the transmission, map, by the at least one communication node, modulated symbols of the transmission only to one or more resources not occupied by the first resource.

14. The wireless communications apparatus of claim 11, wherein the first resource comprises a zero power channel state information reference signal (ZP CSI-RS).

15. The wireless communications apparatus of claim 14, wherein the ZP CSI-RS comprises an aperiodic ZP CSI-RS that is triggered by a downlink control information (DCI) that schedules an uplink transmission.

16. The wireless communications apparatus of claim 11, wherein the first resource comprises a resource of a synchronization signal/physical broadcast channel block (SSB), a resource of a channel state information reference signal (CSI-RS), a resource of a positioning reference signal (RS), a resource within a SSB measurement timing configuration (SMTC) window, a resource configured for received signal strength indication (RSSI) measurement, or a resource configured by a wireless access node of the at least one communication node.

17. The wireless communications apparatus of claim 16, wherein the first resource comprises the resource of the SSB, the processor is further configured to:
perform, by a user device of the at least one communication node, the transmission and not receive the SSB in response to the transmission overlapping the resource of the SSB in a time domain but not in a frequency domain.

18. The wireless communications apparatus of claim 11, wherein the processor is further configured to:
cancel, by the at least one communication node, the transmission in response to the transmission overlapping with the at least one resource element determined as invalid at least in time domain or frequency domain in response to determining to cancel the transmission.

\* \* \* \* \*